Nov. 3, 1959     F. KULCSAR     2,911,370
TITANATE CERAMIC COMPOSITIONS AND ARTICLES
Filed Aug. 25, 1958     3 Sheets-Sheet 1

INVENTOR.
FRANK KULCSAR
BY
ATTORNEY

Nov. 3, 1959 F. KULCSAR 2,911,370
TITANATE CERAMIC COMPOSITIONS AND ARTICLES
Filed Aug. 25, 1958 3 Sheets-Sheet 2

INVENTOR.
FRANK KULCSAR
BY
ATTORNEY

INVENTOR.
FRANK KULCSAR
BY
ATTORNEY

United States Patent Office 2,911,370
Patented Nov. 3, 1959

2,911,370

TITANATE CERAMIC COMPOSITIONS AND ARTICLES

Frank Kulcsar, Fairview Park, Ohio, assignor to Clevite Corporation, Cleveland, Ohio, a corporation of Ohio Application August 25, 1958, Serial No. 756,838

20 Claims. (Cl. 252—62.9)

This application is a continuation-in-part of copending applications Serial Numbers 550,868 and 550,869, filed December 5, 1955, both now abandoned.

This invention relates broadly to compositions of matter and articles of manufacture fabricated therefrom. More particularly, the invention pertains to novel ferroelectric ceramics which are polycrystalline aggregates of certain constituency, as hereinafter described, fired to ceramic maturity and thereafter polarized or capable of being polarized to impart thereto electromechanical transducing properties similar to the well-known piezoelectric effect. The invention also encompasses the unreacted physical mixtures of raw ingredients which are the precursors of such ceramic materials, the reacted product of such mixtures and the articles of manufacture such as electromechanical transducers fabricated from the matured ceramic. It will be understood that the term "ceramic compositions" as used hereinafter is intended to encompass unreacted physical mixtures as well as reacted mixtures and the matured ceramic which is the ultimate product. "Ceramic materials" will be used to refer specifically to the fired or matured ceramic.

The ceramic compositions contemplated by the invention have as their principal constituent compositions selected from the binary system (1) lead titanate-lead zirconate and (2) lead titanate-lead stannate and the ternary system lead titanate-lead zirconate-lead stannate.

Because of their potentially lower cost and their greater durability under adverse atmospheric conditions, ferroelectric ceramic materials have come into prominence in recent years as substitutes for crystals in various transducer applications in the production, measurement and/or sensing of sound, shock vibration, pressures, etc. Among the more promising ceramics for this purpose is lead zirconate titanate, a polycrystalline material composed of $PbZrO_3$ and $PbTiO_3$ effectively in solid solution. In certain ranges of composition on the basis of mol percentages of its constituents, lead zirconate titanate exhibits highly desirable electrical and mechanical properties, particularly, when electrostatically polarized, a high electromechanical coupling. These ranges and examples of preferred compositions and their properties are disclosed with particularity in U.S. Letters Patent Number 2,708,244, issued on May 10, 1955, to Bernard Jaffe.

Similar to lead zirconate titanate in structure and properties are materials from the ternary system $BbZrO_3$—$PbTiO_3$—$PbSnO_3$. Within certain ranges hereinafter set forth, members of these systems also display marked ferroelectric properties rendering them useful in the same general fields of application as the lead zirconate titanate ceramics. A large number of such compositions from the lead titanate-lead zirconate-lead stannate system are disclosed in National Bureau of Standards Report No. 3684 (Jaffe, Roth and Marzullo, Report No. 9, October 1, 1954) entitled "Improvements in Piezoelectric Ceramics," and summarized more fully in Research Paper 2626 by the same authors, entitled "Properties of Piezoelectric Ceramics in the Solid-Solution Series Lead Titanate-Lead Zirconate-Lead Oxide: Tin Oxide and Lead Titanate-Lead Hafnate," published in the Journal of Research of the National Bureau of Standards, vol. 55, No. 5, November 1955, pp. 239–254.

Prepolarized ceramics for piezoelectric and electrostrictive applications are a comparatively recent development and while intensive research by workers in the field has succeeded in producing materials acceptable for some commercial purposes, before the full potentialities of these materials can be realized, many problems, some or all of which pertain in varying degrees to all known ferroelectric ceramics, must be overcome.

Among the more important disadvantages is the "aging" of prepolarized ceramic elements resulting in the decay or diminishing of the electromechanical coupling and/or the variation of important physical and/or electrical properties such as the resonant frequency, capacitance, etc. with time. Similarly, many of these properties are affected by the ambient temperature and it will be apparent to those conversant with the art that the variations of properties with time and/or temperature is intolerable in many important applications of piezoelectric elements, for example, frequency control, filters, etc.

Another important desideratum in ferroelectric ceramics is that they be capable of being polarized with a maximum facility, i.e., quickly, and without electrical breakdown or mechanical failure.

A further problem in the field of ceramic transducers is the fact that all or most of the important properties required for a given application do not coincide in any single known material and improvements in one property usually are achieved, if at all, at the expense of another. For example, some ferroelectric ceramics are characterized by a higher electromechanical sensitivity than others but have a lower dielectric constant. Chemical modification to effect improvement of the dielectric properties frequently results in an unwanted decrease in electromechanical response. Thus in uses where maximum values for both of these properties are desirable, a compromise is necessary. Another frequently encountered difficulty in attempting the modification of ceramics, is the lowering of the Curie temperature, which if exceeded in use, results in complete or partial depolarization of the elements.

The present invention contemplates improved ceramic compositions comprising at least 95% by weight, in oxidic form, of lead, titanium and zirconium and/or tin in stoichiometric proportions corresponding to lead titanate and lead zirconate and/or lead stannate. In the ceramic compositions, up to about 20 atom percent of the lead may be substituted for by at least one alkaline earth metal selected from the group consisting of strontium and calcium. The balance of the ceramic compositions further comprises, also in oxidic form, at least 0.1 weight percent of at least one member of the group consisting of niobium, tantalum, and the rare earth elements including yttrium but excluding cerium.

The rare earth elements comprise the series of elements in the periodic table beginning with element No. 57, lanthanum, and ending with element No. 71, lutecium, and also includes element No. 39, yttrium. As well known to those skilled in the chemical art, these elements show a remarkable similarity in the chemical and physical nature of their compounds.

It is pointed out that there is some uncertainty and conflict of opinion on the stability and separate existence of lead stannate; therefore, it is to be understood that lead stannate may be considered as lead oxide (PbO) and tin oxide ($SnO_2$) in the stoichiometric proportions (a mol ratio 1:1) corresponding to the empirical formula $PbSnO_3$. It is further pointed out that the weight percentages of ingredients hereinafter stated are calculated on the basis of their respective oxides.

These novel compositions are characterized by high electromechanical couplings and, as compared to conventional lead zirconate titanate compositions, have a much higher resistivity and higher relative permittivity or dielectric constant K. They are also characterized by time and/or temperature stability of these important properties. The invention also encompasses articles of manufacture, such as electromechanical transducers, utilizing these novel compositions and exploiting their unique combination of properties.

It is, therefore, the fundamental object of the present invention to provide novel and improved piezoelectric ceramic materials which overcome at least one of the problems outlined above.

A more specific object of the invention is to provide improved polycrystalline ceramics characterized by high Curie temperatures, relative permittivity and piezoelectric response and a stable frequency constant, over a relatively wide range of operating temperatures.

It is a further object of the invention to provide new and useful ferroelectric ceramic materials characterized by desirable electrical, electromechanical, and physical properties which are less susceptible to decay or variation with age and/or temperature than comparable conventional materials.

Another object is the provision of ceramic materials combining high piezoelectric effect with a high dielectric constant.

A still further object of the invention is the provision of improved electromechanical transducers utilizing, as the active elements, an electrostatically polarized body of the novel ceramic compositions alluded to above and hereinafter described and claimed.

These and other objects of the invention, its advantages, scope and the manner in which it is practiced will be readily apparent to those conversant with the art from a reading of the following description and subjoined claims in conjunction with the annexed drawing, in which, Fig. 1 is a perspective elevational view of an electromechanical transducer embodying the present invention;

Figure 1:
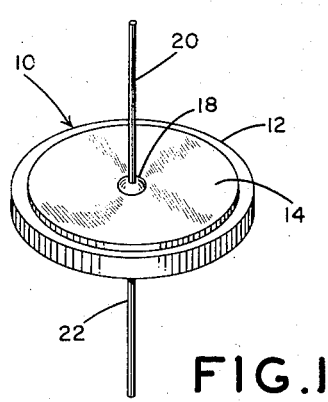
Figure 2:
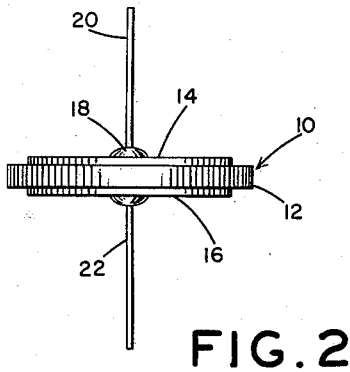
Fig. 2 is a side elevational view of the transducer shown in Fig. 1.

Before proceeding with a detailed description of the ferroelectric ceramic materials contemplated by the invention, their application in electromechanical transducers will be described with reference to Figures 1 and 2 of the drawings wherein reference character 10 designates, as a whole, an electromechanical transducer having, as its active element, a preferably disc-shaped body 12 of a piezoelectric ceramic material according to the present invention.

Body 12 is electrostatically polarized, in a manner hereinafter set forth, and is provided with a pair of electrodes 14 and 16, applied in a suitable manner, on two opposed surfaces thereof. Conductively attached to the electrodes 14 and 16, as by solder 18, are respective wire leads 20 and 22 operative to connect the transducer in the electrical or electronic circuit, not shown, in which it is to be employed. As well known in the art, an electromechanical transducer operates to convert applied electrical energy to mechanical energy, and vice versa. Therefore, if the ceramic body is subjected to mechanical stresses, the resulting strain generates an electrical output appearing as a voltage across the leads 20, 22. Conversely, a voltage applied across the leads produces a strain or mechanical deformation of ceramic body 12. It is to be understood that the term electromechanical transducer as used herein is taken in its broadest sense and includes piezoelectric filters, frequency control devices, and the like, and that the invention may also be used and adapted to various other applications requiring materials having dielectric, piezoelectric and/or electrostrictive properties.

For sake of clarity and ease of description, the constituents of compositions according to the invention may be categorized as "principal" and "secondary," the former term applying to those making up a major fraction of the whole composition and the latter making up a minor fraction. The principal ingredients, then, are lead titanate and either or both lead zirconate and lead stannate. The secondary ingredients comprise from zero to 20 atom percent, in the aggregate, of calcium and/or strontium, substituted for an equivalent quantity of the lead in the principal ingredients, and from 0.1 to 5.0 weight percent, in the aggregate, of at least one member of the group consisting of niobium, tantalum, and the rare earth elements including yttrium but excluding cerium. Also for purposes of simplification, the principal ingredients will be considered as basic compositions to which the secondary ingredients are added as direct additions or as substituents. It will be understood, however, that compositions according to the present invention may be formulated from various starting materials and intermediates.

From the foregoing, it will be appreciated that the basic compositions fall into three categories: (1) those belonging to the binary system lead zirconate-lead titanate; (2) those belonging to the binary system lead stannate-lead titanate; and (3) those belonging to the ternary system lead zirconate-lead stannate-lead titanate. The designations binary and ternary are used in conjunction with the basic compositions and in disregard of the secondary ingredients.

Furthermore, as will be appreciated by those conversant with the art, hafnium occurs as an impurity in varying amounts in zirconium; for the purposes of the invention, hafnium may be regarded as the substantial equivalent of zirconium and the presence of hafnium either as an impurity or as a substituent for zirconium is acceptable. However, because the high relative cost of hafnium as compared to zirconium renders its use uneconomic in commercial manufacture of the compositions under discussion, the present description will disregard the possible presence of hafnium. It will also be appreciated that various rare earth metals, because of scarcity and relatively high cost, would not be economically competitive with others though fully operative from the technical standpoint.

Figure 3:
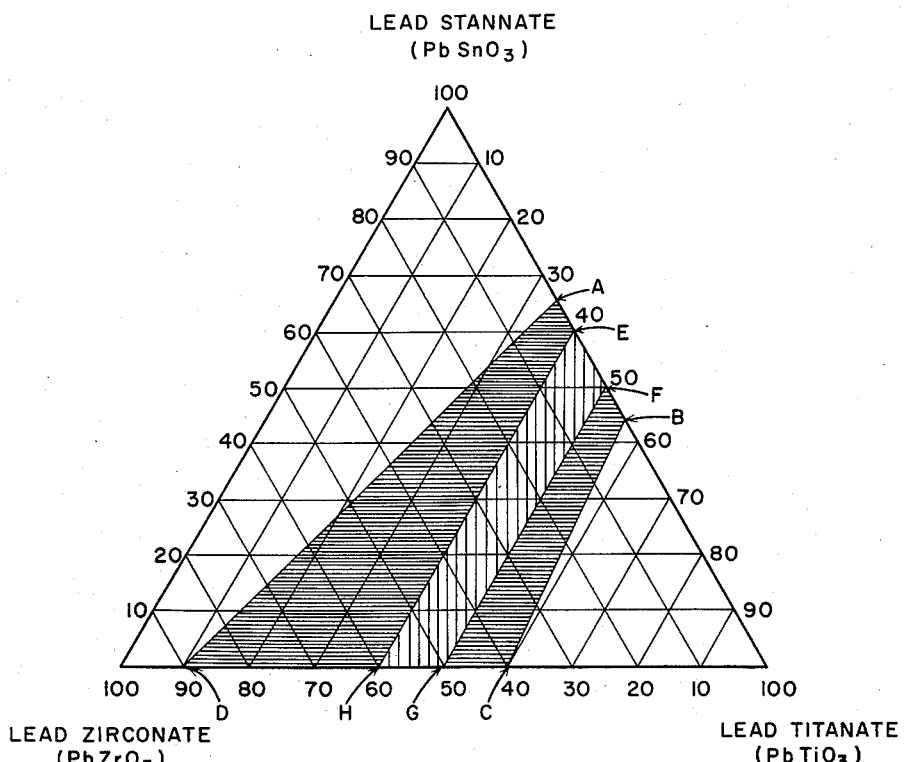
Fig. 3 is a triangular compositional diagram of materials utilized in the present invention.

All possible basic compositions coming within all three of the systems defined above are represented by the triangular diagram constituting Figure 3 of the drawings. All compositions represented by the diagram as a whole, however, are not ferroelectric, and many are electromechanically active only to a very slight degree. The basic compositions utilized in the present invention are those exhibiting piezoelectric response of appreciable magnitude. As a matter of convenience, the planar coupling, $k_p$ (also known as radial coupling, $k_r$ and disk coupling $k_{disk}$) of prepolarized test disks will be taken as a measure of piezoelectric activity. Thus, within the horizontally hatched area bounded by lines connecting points ABCD, Figure 3, all basic compositions polarized and tested showed a radial coupling coefficient of at least 0.10. The area bounded by ABCD includes binary lead zirconate-lead titanate solid solutions lying on the line DC along which the mol ratio ($PbZrO_3:PbTiO_3$) of the end components varies from 90:10 to 40:60. Among these base line compositions those falling between points H and G have characteristically higher radial couplings with the highest couplings occurring where the $PbZrO_3:PbTiO_3$ mol ratio is around 53:47 or 54:46.

The binary basic compositions on line AB ($PbSnO_3$: $PbTiO_3$ from 65:35 to 45:55) of the Figure 3 diagram are similar to those on line DC in structure but are characterized by generally lower radial couplings with the best couplings occurring in compositions falling between points E and F, i.e., with the mol ratio PbSnO₃:PbTiO₃ in the range 60:40 to 50:50.

In the ternary basic compositions within the area designated ABCD, the inclusion of PbSnO₃ as a substituent for a portion of the PbZrO₃ in the base line compositions has the effect of progressively lowering the Curie temperature but the compositions retain a relatively high radial coupling, particularly in the area of the diagram bounded by lines connecting points EFGH.

As previously mentioned, the basic compositions described above may, if desired, be modified by the substitution of calcium and/or strontium for a part of the lead. This substitution, on an atom basis, is permissable up to a maximum aggregate quantity of 20 percent of calcium and/or strontium, with a preferred range of 5 to 15 percent.

The general empirical formula for these basic compositions may be expressed

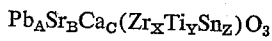

$$Pb_A Sr_B Ca_C (Zr_X Ti_Y Sn_Z) O_3$$

wherein A, B, C, X, Y and Z (subscripts) represent the mol fraction or atom percent of the respective component symbols with which each is associated and have the numerical values:

$A = 1.00$ to $0.80$
$B = 0$ to $0.20$
$C = 0$ to $0.20$
$B + C = 0$ to $0.20$
$X = 0$ to $0.90$
$Y = 0.10$ to $0.60$
$Z = 0$ to $0.65$, and
$A + B + C = X + Y + Z = 1.00$ Further details, examples, and physical and electrical properties of the basic compositions containing calcium and/or strontium may be had by reference to copending application for Letters Patent Serial Number 527,720, filed on August 11, 1955, by F. Kulcsar and C. G. Cmolik and assigned to the same assignee as the present invention.

In accordance with the present invention novel and improved ferroelectric ceramic compositions comprise basic compositions as described above, selected from the area ABCD or, preferably, EFGH, of the Figure 3 diagram, with or without substitution of calcium and/or strontium for lead, and containing additions of 0.1 to 5.0 weight percent, in the aggregate, of at least one member of the group consisting of niobium, tantalum, and the rare earth elements including yttrium but excluding cerium, also in oxidic form. The rare earth members of this group may be referred to hereinafter as the "three-valent" addition and tantalum and niobium as the "five-valent" additions.

The compositions proposed may be prepared in accordance with various ceramic procedures, which, in themselves are well known in the art. Two fundamental variations possible are (1) compounding the basic compositions (including the optional substitution of calcium and/or strontium for lead) to which the rare earth component may be added in the desired porportions; (2) combining all component ingredients, in suitable forms, at the outset. The first is preferred because it facilitates production of a variety of specific final materials from a master mix of a given basic composition.

The preferred method of preparing the basic compositions involves the use of lead oxide (PbO) zirconia (ZrO₂) and titania (TiO₂), all of relatively pure grade (e.g., C.P. grade), combined in proper proportions. (In some cases a small excess of lead oxide may be employed to balance the additions.) If strontium and/or calcium are to be used, these are added in the form of a reasonably reactive compound. The carbonates of these alkaline earth metals are preferred because of their ready commercial availability at relatively low cost and in suitable purity. The combined ingredients are then wet or dry milled to achieve thorough mixing and particle size reduction. In milling the mixture care should be exercised to avoid, or the proportions of ingredients varied to compensate for, contamination by wear of the milling balls or stones.

The invention, however, is not concerned with the specific means or methods by which the proper proportions in and reproducibility of the final product are achieved and accordingly the ranges given in this description and in the subjoined claims are those desired or intended, exclusive of impurities in the raw materials, assuming that suitable precautions are taken in the preparation to avoid, control and/or compensate for contamination.

After the first milling, the mixture is dried (if wet milled) and reground sufficiently to assure as homogeneous a mixture as possible. At this stage the three-valent and/or five-valent additions are thoroughly admixed. Thereafter, the mixture, either loose or suitably formed into desired shapes is pre-reacted by sintering at a temperature of around 850° C. for approximately 2 hours. It is desirable to control loss of lead during the heating by suitable means, such as by carrying out the sintering in an enclosure containing a source of lead oxide vapor as explained in the aforementioned U.S. Patent Number 2,708,244. The specific conditions of sintering will, of course, depend on such variable factors as the size and shape of the batch, and may be selected in accordance with established ceramic techniques to suit the particular case, the object being to approach, as closely as possible, a complete reaction of the mixture.

Following the pre-sintering, the reacted material is allowed to cool and is then crushed and milled to a small particle size. Once again, suitable precautions should be exercised to avoid, control and/or compensate for ball wear contamination during milling. When milling is completed, the pre-sintered mixture is ready for forming into the desired shapes and firing to maturity. Depending on preference and the shapes desired, the material may be formed into a mix or slip suitable for pressing, slip casting, or extruding, as the case may be, in accordance with conventional ceramic procedures.

The samples for which data are given hereinbelow were prepared by admixing with 100 grams of the milled pre-sintered mix, 3 cc. of a bonding and lubricating agent consisting of equal parts by volume of water and Ceremul C. Ceremul C is a commercially available product consisting of an aqueous dispersion (41 to 46% solids) of paraffin (M.P. 122° F.). The mix was then pressed into disks, roughly 1-inch in diameter and 2 to 3 mm. thick, which were fired to maturity at a temperature around 1280° C. for about 45 minutes, with suitable precautions taken to avoid or control loss of lead components through volatilization.

The fired shapes may then be polarized in a manner well known in the art, for example, by applying a pair of electrodes (e.g., 14, 16, Figures 1 and 2) to opposite faces of the ceramic bodies and applying an electrostatic field to the electrodes. While the particular conditions of polarization may be varied as desired, D.C. field strengths of 150 to 175 volts per mil, at room temperature, sustained for one hour have given satisfactory results. Another method of polarizing, utilized to pole the ceramic bodies on which data are hereinafter presented, is disclosed and claimed in an application for Letters Patent, Serial No. 527,712, filed August 11, 1955, and assigned to the same assignee as the present invention. Examples of specific ceramic compositions according to this invention and various pertinent electrical and electromechanical properties thereof are given in the following table in which the various constants and coefficients are defined as follows:

K: relative dielectric constant; permittivity of the material relative to permittivity of space
$k_p$: planar piezoelectric coupling cofficient
Percent D—Dissipation—Dielectric loss or power factor measured at 1 kc.

54:46. It is to be noted, however, that couplings materially lower than 0.35 are still very good and entirely satisfactory for many piezoelectric applications. For example, $BaTiO_3$, perhaps the most widely used ferroelectric ceramic at the present time, has a planar coupling coefficient of the order of .35–.40. Moreover, in certain uses of ferroelectric ceramics, e.g., electromechanical

| Group No. | Example No. | Intended Composition | Relative Dielectric Constant, K 24 Hours after Poling | Coefficient of planar Coupling, $k_p$ | Dissipation, Percent D |
|---|---|---|---|---|---|
| 0 | 0 | $Pb(Zr_{0.53}Ti_{0.47})O_3$ | 475–600 | .450–.500 | .39–1.26 |
| 0 | 00 | $Pb(Zr_{0.54}Ti_{0.46})O_3$ | 475–600 | .450–.500 | .39–1.26 |
| I | 1 | $Pb(Zr_{0.54}Ti_{0.46})O_3$+1 w. percent $Y_2O_3$ | 840 | .345 | |
| I | 2 | $Pb(Zr_{0.54}Ti_{0.46})O_3$+1 w. percent $La_2O_3$ | 1,580 | .556 | 1.75 |
| I | 3 | $Pb(Zr_{0.54}Ti_{0.46})O_3$+2 w. percent $La_2O_3$ | 1,550 | .512 | 2.25 |
| I | 4 | $Pb(Zr_{0.54}Ti_{0.46})O_3$+1 w. percent $Nd_2O_3$ | 1,410 | .490 | 1.78 |
| I | 5 | $Pb(Zr_{0.54}Ti_{0.46})O_3$+1 w. percent $Sm_2O_3$ | 1,419 | .444 | 1.96 |
| I | 6 | $Pb(Zr_{0.54}Ti_{0.46})O_3$+1 w. percent $Pr_2O_3$ | 1,455 | .490 | 1.80 |
| I | 7 | $Pb(Zr_{0.54}Ti_{0.46})O_3$+1 w. percent Didymium Oxide [1] | 1,281 | .432 | 1.73 |
| II | *9 | $Pb(Zr_{0.54}Ti_{0.46})O_3$+1 w. percent $Nb_2O_5$ | 1,270 | .530 | 1.82 |
| II | 10 | $Pb(Zr_{0.54}Ti_{0.46})O_3$+2 w. percent $Nb_2O_5$ | 1,202 | .506 | 1.92 |
| II | 8 | $Pb(Zr_{0.54}Ti_{0.46})O_3$+0.5 w. percent $Nb_2O_5$ | 790 | .458 | 2.00 |
| III | 11 | $Pb(Zr_{0.54}Ti_{0.46})O_3$+1 w. percent $Ta_2O_5$ | 1,186 | .490 | 1.45 |
| III | 12 | $Pb(Zr_{0.54}Ti_{0.46})O_3$+1.5 w. percent $Ta_2O_5$ | 1,275 | .483 | 1.80 |
| III | 13 | $Pb(Zr_{0.54}Ti_{0.46})O_3$+2.0 w. percent $Ta_2O_5$ | 1,274 | .478 | 1.80 |
| III | 14 | $Pb(Zr_{0.54}Ti_{0.46})O_3$+2.5 w. percent $Ta_2O_5$ | 1,112 | .358 | 2.38 |
| III | 15 | $Pb(Zr_{0.54}Ti_{0.46})O_3$+5 w. percent $Ta_2O_5$ | 1,052 | .339 | 2.60 |
| IV | *9 | $Pb(Zr_{0.54}Ti_{0.46})O_3$+1 w. percent $Nb_2O_5$ | 1,271 | .530 | 1.82 |
| IV | 16 | $Pb(Zr_{0.52}Ti_{0.48})O_3$+1 w. percent $Nb_2O_5$ | 1,496 | .530 | 1.80 |
| IV | 17 | $Pb(Zr_{0.50}Ti_{0.50})O_3$+1 w. percent $Nb_2O_5$ | 875 | .344 | 1.31 |
| V | 18 | $Pb_{0.95}Sr_{0.05}(Zr_{0.54}Ti_{0.46})O_3$+1 w. percent $Nb_2O_5$ | 1,610 | .563 | 2.03 |
| V | 19 | $Pb_{0.95}Sr_{0.05}(Zr_{0.54}Ti_{0.46})O_3$+2 w. percent $Nb_2O_5$ | 1,662 | .475 | 2.07 |
| V | 20 | $Pb_{0.95}Sr_{0.05}(Zr_{0.54}Ti_{0.46})O_3$+3 w. percent $Nb_2O_5$ | 1,301 | .362 | 2.14 |
| VI | 23 | $Pb_{0.95}Sr_{0.05}(Zr_{0.54}Ti_{0.46})O_3$+1 w. percent $La_2O_3$ | 1,790 | .510 | 1.65 |
| VI | 21 | $Pb_{0.95}Sr_{0.05}(Zr_{0.54}Ti_{0.46})O_3$+0.2 w. percent $La_2O_3$ | 780 | .383 | .88 |
| VI | 22 | $Pb_{0.95}Sr_{0.05}(Zr_{0.54}Ti_{0.46})O_3$+0.4 w. percent $La_2O_3$ | 1,045 | .379 | 1.73 |
| VI | 24 | $Pb_{0.95}Sr_{0.05}(Zr_{0.54}Ti_{0.46})O_3$+2 w. percent $La_2O_3$ | 1,880 | .445 | 2.14 |
| VII | 25 | $Pb_{0.97}Sr_{0.03}(Zr_{0.53}Ti_{0.47})O_3$+1 w. percent $La_2O_3$ | 1,700 | .468 | 2.12 |
| VII | 26 | $Pb_{0.97}Sr_{0.03}(Zr_{0.54}Ti_{0.46})O_3$+1 w. percent $La_2O_3$ | 1,735 | .515 | 2.30 |
| VII | 27 | $Pb_{0.97}Sr_{0.03}(Zr_{0.55}Ti_{0.45})O_3$+1 w. percent $La_2O_3$ | 1,475 | .510 | 2.69 |
| VIII | 28 | $Pb_{0.985}Sr_{0.015}(Zr_{0.53}Ti_{0.47})O_3$+1 w. percent $La_2O_3$ | 1,611 | .475 | 2.20 |
| VIII | 29 | $Pb_{0.985}Sr_{0.015}(Zr_{0.54}Ti_{0.46})O_3$+1 w. percent $La_2O_3$ | 1,596 | .509 | 2.43 |
| VIII | 30 | $Pb_{0.985}Sr_{0.015}(Zr_{0.55}Ti_{0.45})O_3$+1 w. percent $La_2O_3$ | 1,205 | .505 | 2.93 |
| IX | *31 | $Pb(Zr_{0.54}Ti_{0.46})O_3$+.5 w. percent $Nb_2O_5$+.5 w. percent $La_2O_3$ | 1,445 | .525 | 1.84 |
| IX | 32 | $Pb(Zr_{0.54}Ti_{0.46})O_3$+.5 w. percent $Nb_2O_5$+.5 w. percent $Nd_2O_3$ | 1,484 | .531 | 1.91 |
| IX | 33 | $Pb(Zr_{0.54}Ti_{0.46})O_3$+.5 w. percent $Ta_2O_5$+.5 w. percent $Nd_2O_3$ | 1,422 | .475 | 1.67 |
| IX | 34 | $Pb(Zr_{0.54}Ti_{0.46})O_3$+.5 w. percent $Ta_2O_5$+.5 w. percent $La_2O_3$ | 1,328 | .530 | 2.05 |
| X | 35 | $Pb(Zr_{0.54}Ti_{0.46})O_3$+.5 w. percent $Ta_2O_5$+.5 w. percent $Nb_2O_5$ | 1,293 | .535 | 1.98 |
| X | 36 | $Pb(Zr_{0.54}Ti_{0.46})O_3$+.5 w. percent $La_2O_3$+.5 w. percent $Nd_2O_3$ | 1,474 | .494 | 2.26 |
| X | 37 | $Pb(Zr_{0.54}Ti_{0.46})O_3$+.4 w. percent $Nb_2O_5$+.6 w. percent $La_2O_3$ | 1,421 | .560 | 2.05 |
| XI | *31 | $Pb(Zr_{0.54}Ti_{0.46})O_3$+.5 w. percent $Nb_2O_5$+.5 w. percent $La_2O_3$ | 1,445 | .525 | 1.84 |
| XI | 38 | $Pb(Zr_{0.54}Ti_{0.46})O_3$+.6 w. percent $Nb_2O_5$+.4 w. percent $La_2O_3$ | 1,437 | .572 | 1.97 |
| XI | 39 | $Pb(Zr_{0.54}Ti_{0.46})O_3$+.7 w. percent $Nb_2O_5$+.3 w. percent $La_2O_3$ | 1,322 | .557 | 2.17 |
| XII | 40 | $Pb(Zr_{0.4275}Sn_{0.10}Ti_{0.4725})O_3$+1 w. percent $La_2O_3$ | 1,550 | .500 | 2.20 |
| XII | 41 | $Pb(Zr_{0.4275}Sn_{0.10}Ti_{0.4725})O_3$+1 w. percent $Nb_2O_5$ | 1,478 | .531 | 1.85 |

* Repeated.
[1] Percentage weight analysis: $La_2O_3$—45.5; $Pr_2O_3$—11.0; $Nd_2O_3$—38.0; $Sm_2O_3$—4.0; Y-earth oxides—0.4; Other rare earthmetal oxides—1.1.

Referring now to the table of exemplary compositions, it will be noted that Examples Nos. 0 and 00 are unmodified lead zirconate titanate ceramics of slightly different mol ratios. These conventional compositions are included in the table to serve as a datum or basis for comparison and these particular mol ratios were selected because they exhibit the highest electromechanical coupling coefficients ($k_p$) and dielectric constants (K). It will be noted therefore, that the best unmodified lead zirconate titanate compositions exhibit a dielectric constant of 475 to 600. On the other hand, the compositions embraced by the present invention all are characterized by a significantly higher dielectric constant. Referring in this connection to the examples given in the table, the composition having the lowest dielectric constant is No. 8 for which $K=790$ and is about a 30% improvement over the upper limit of the range for the best unmodified lead zirconate titanate compositions. The increase is dielectric constant ranges up to about 300% for compositions No. 23 ($K=1790$) and No. 26 ($K=1735$). By comparing the planar coupling coefficients of these compositions (Nos. 8, 23 and 26) it will be appreciated that the improvement in dielectric constant is accomplished without sacrifice in coupling although this is not always the case. For example, compositions Nos. 1, 14, 15, 17, 20, 21 and 22 have coupling coefficients of the order of .35 which is somewhat lower than unmodified lead titanate-lead zirconate in mol ratios of 53:47 and 54:46. It is to be noted, however, that couplings materially lower than 0.35 are still very good and entirely satisfactory for many piezoelectric applications. For example, $BaTiO_3$, perhaps the most widely used ferroelectric ceramic at the present time, has a planar coupling coefficient of the order of .35–.40. Moreover, in certain uses of ferroelectric ceramics, e.g., electromechanical resonators for electric wave filters, a coupling coefficient of 0.35 or less is sometimes preferred over higher couplings.

Proceeding with the survey of the example compositions presented in the table, it will be noted that many have much higher dielectric constants as compared to the best mol ratio lead zirconate titanate without any appreciable sacrifice of coupling. Among these are compositions Nos. 4, 6, 11–13, 25, 28, 33, 36, and 40. Furthermore, a large number of the compositions according to the present invention are characterized not only by higher dielectric constants but by markedly increased coupling as well. Examples of this effect are compositions Nos. 2, 3, 9, 16, 18, 31, 32, 34 and 35.

The electrical dissipation, an important consideration in dielectric materials, is quite low (less than 3%), for compositions according to the invention.

The examples presented in the table have been selected to represent a broad cross-section of those falling within the scope of the disclosure and to show the effect of varying different compositional parameters. To facilitate comparison, the examples are arranged in groups and some are repeated in two or more groups. Group I (Examples Nos. 1 through 7) shows the effect of small quantities of different three-valent (rare earth) additions, viz., yttrium, lanthanum, neodymium, samarium, praseodymium and didymium oxide. Ignoring Example No. 3 for the moment, these compositions each contain 1 weight percent of the three-valent addition, the mol ratio of the basic lead zirconate material being the same, i.e., 54:46, in all cases. From the data given it will be seen that the general effect of any of the three-valent additions is a significant to vast improvement (increase) in dielectric constant without any untoward diminution of coupling. At this juncture it is pointed out that 1 weight percent is the preferred quantity for both the three-valent and the five-valent additions. As will be apparent from a review of the table, this quantity is generally the most effective. Lesser amounts make themselves felt and, while there does not appear to be much difference between the effect of 1 and 2 weight percent larger quantities are progressively less effective.

Of particular interest among compositions Nos. 1–7, is the last which contains 1 weight percent didymium oxide. As set forth in footnote 1 of the table, the didymium oxide used had the following percentage weight analysis:

|  | Percent |
|---|---|
| $La_2O_3$ | 45.5 |
| $Pr_2O_3$ | 11.0 |
| $Nd_2O_3$ | 38.0 |
| $Sm_2O_3$ | 4.0 |
| Y-earth oxides | 0.4 |
| Other rare earth | } 1.1 |
| Metal oxide |  |
| Total | 100.0 |

The importance of this composition is two-fold: (1) it shows that a combination of three-valent additions operates in the same manner as individual additions and (2) it represents what is probably the least expensive embodiment of the subject invention inasmuch as didymium oxide is by far the most economical form of rare earth oxides.

Referring again to the table, groups II and III, (Examples Nos. 8–10 and 11–15, respectively) show the effect of the two five-valent additions, Ta and Nb and the effect of varying the quantities from 0.5 to 5 weight percent. To permit comparison with the three-valent additions, the lead zirconate-lead titanate mol ratio is the same 54:46 as in the compositions of group I.

It will be immediately evident that the compositions of groups II and III display properties (viz., K and $k_p$) similar to those of group I and that the effects of the different five-valent additions are similar as between themselves as well as in comparison to the three-valent additions. Referring to compositions 8–10, there is little change in dielectric constant as the amount of $Nb_2O_5$ is varied between 1 and 2 weight percent. The 0.5 weight percent additions of the $Nb_2O_5$ (Example No. 8) is still sufficient to produce about a 30% increase in K without sacrifice of coupling. Examples 11 to 15 likewise reveal little variation in K as the $Ta_2O_5$ is varied between 1 and 2 weight percent; however, both K and $k_p$ decrease perceptibly as the $Ta_2O_5$ is increased to 2.5 and 5.0 weight percent.

Group IV consists of three compositions, Nos. 9, 16 and 17; the addition, 1 w. percent $Nb_2O_5$, is held constant throughout the group, in order to show the effect of varying the mol ratio of $PbZrO_3$ to $PbTiO_3$. For these particular compositions, the highest K and $k_p$ are exhibited at the 52:48 mol ratio (Example No. 16). For unmodified (i.e., conventional) lead zirconate titanate, the compositional phase boundary is at approximately the 53:47 mol ratio and, at room temperatures, both the $k_p$ and K reach maxima at or near this phase boundary, say, between 52:48 and 54:46. Compositions according to the invention behave similarly. In the three compositions of group IV, the coupling (.530) is greatest at the 54:46 mol ratio (Example 9) but the dielectric constant (1577) highest at the 52:48 mol ratio (Example 16). At the mol ratio 50:50 (Example 17), both the coupling and permittivity have dropped off considerably and this trend continues as the mol ratio is varied in either direction farther from the phase boundary.

Groups V and VI consisting of three and four compositions each, respectively, viz., 18, 19, 20 and 21, 22, 23 and 24, exemplify compositions wherein five atom percent of the lead is replaced with an equivalent quantity of strontium. The 54:46 mol ratio of $PbZrO_3$ to $PbTiO_3$ is maintained throughout both groups.

In group V, a five-valent addition, viz., $Nb_2O_5$, is used in quantities ranging from 1 to 3 weight percent. Considering the group as a whole it will be seen that the substitution of strontium further enhances the compositions by additionally increasing permittivity as compared to group II. Specific comparison can be made between Examples 18 and 9 wherein the only compositional variation is the 5 atom percent Sr in the former resulting in a 25% higher dielectric constant and even a small increase in coupling. Comparing Examples Nos. 10 and 19, both containing 2 wt. percent $Nb_2O_5$, the substitution of Sr in the latter results in still higher K, 1885, in contrast to 1202 for the former. It should also be noted that whereas the increase from 1 to 2 wt. percent $Nb_2O_5$ in compositions (Nos. 9 and 10) containing no Sr does not raise the permittivity (actually the particular data presented show a drop in K), the increase of $Nb_2O_5$ in compositions (Nos. 18 and 19) containing 5 atom percent Sr results in a further increase in K. One effect at least of the Sr substitution appears to be synergistic, i.e., to enhance and extend the range of effectiveness of the additions.

The discussion immediately preceding applies in general to group VI also. Here it will be noted that, with the 5 atom percent substitution of Sr for Pb, as little as 0.2 w. percent $La_2O_3$ (Example No. 21) results in a noteworthy increase in permittivity.

Groups VII and VIII, individually, show the effect of varying $PbZrO_3/PbTiO_3$ mol ratio on compositions containing fixed amounts of Sr and $La_2O_3$; in each case, the compositions with a 54:46 ratio had the highest couplings while the dielectric constant was substantially the same for both 53:47 and 54:46.

Comparing compositions 23, 26 and 29 demonstrates that 5 atom percent Sr produces the best combination of dielectric constant and coupling coefficient.

The group IX compositions demonstrate the equivalency and inter-changeability, for the purpose of the invention, of the five-valent elements Ta and Nb on one hand and the three-valent rare earth elements on the other. Thus, Examples 31–34 inclusive, show that high coupling and dielectric compositions may be achieved by various combinations of three and five-valent additions.

Good results may be obtained also by combinations of different rare earth elements (Example No. 35) and of Ta and Nb (Example No. 36). Moreover, combinations of additions may be used in various proportions as shown by the Group XI examples.

The basic compositions also may be varied by substitution of the tin for part of the Zr and Ti as shown by the compositions of group XII.

The effect of Ta, Nb, and the rare earth elements on resistivity is uniformly beneficial: in all examples tested containing 1 to 2 weight percent of these additions (viz., lanthana, neodymia, niobia, tantala) this effect is a very pronounced increase in volume resistivity as compared to unmodified lead zirconate titanate. At temperatures up to 500° C., the increase amounts to between 3 and 3½ orders of magnitude.

This characteristically high resistivity is of considerable importance in some transducer applications, e.g., for achieving low-frequency response in accelerometers.

As well known in the art, one of the important factors in certain transducer applications is the $d_{31}$ coefficient of the material. The $d_{31}$ coefficient is a direct function of the dielectric constant and the coupling coefficient and consequently, materials exhibiting both a high dielectric constant and coupling coefficient are possessed of an unusually high $d_{31}$ coefficient and therefore are admirably suited to such applications.

Figure 6:
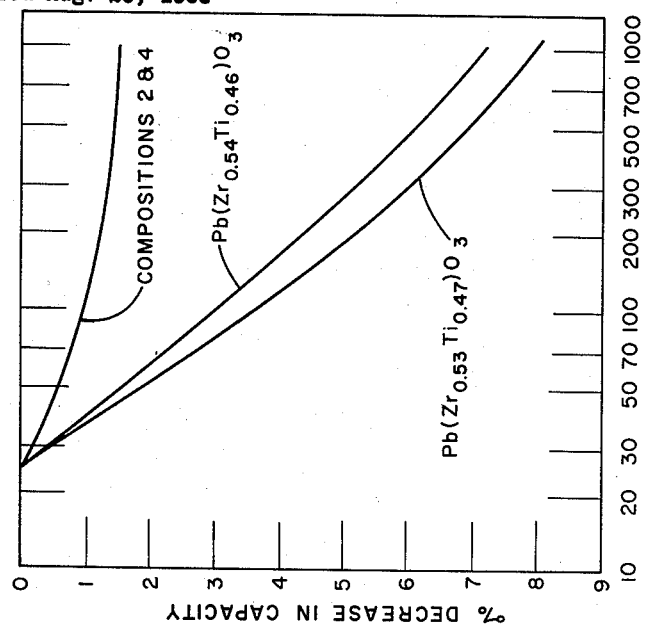
Figs. 4–8 are graphic representations of the effect of temperature and aging on resonant frequency ($f_r$), planar coupling coefficient ($k_p$), capacitance ($c$) and dielectric constant (K) of exemplary compositions according to the present invention as compared with comparable conventional ceramics.
Figure 4:
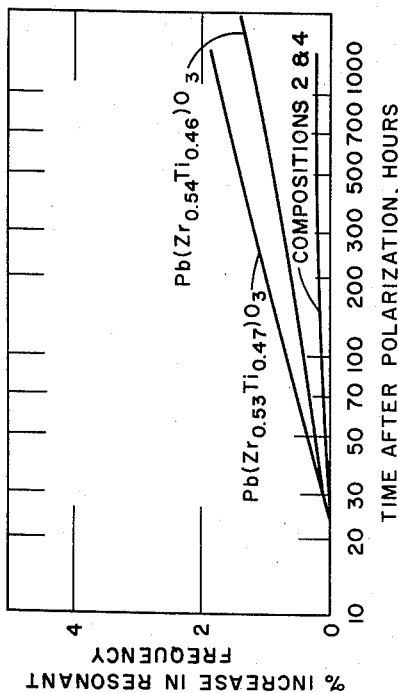
Figure 7:
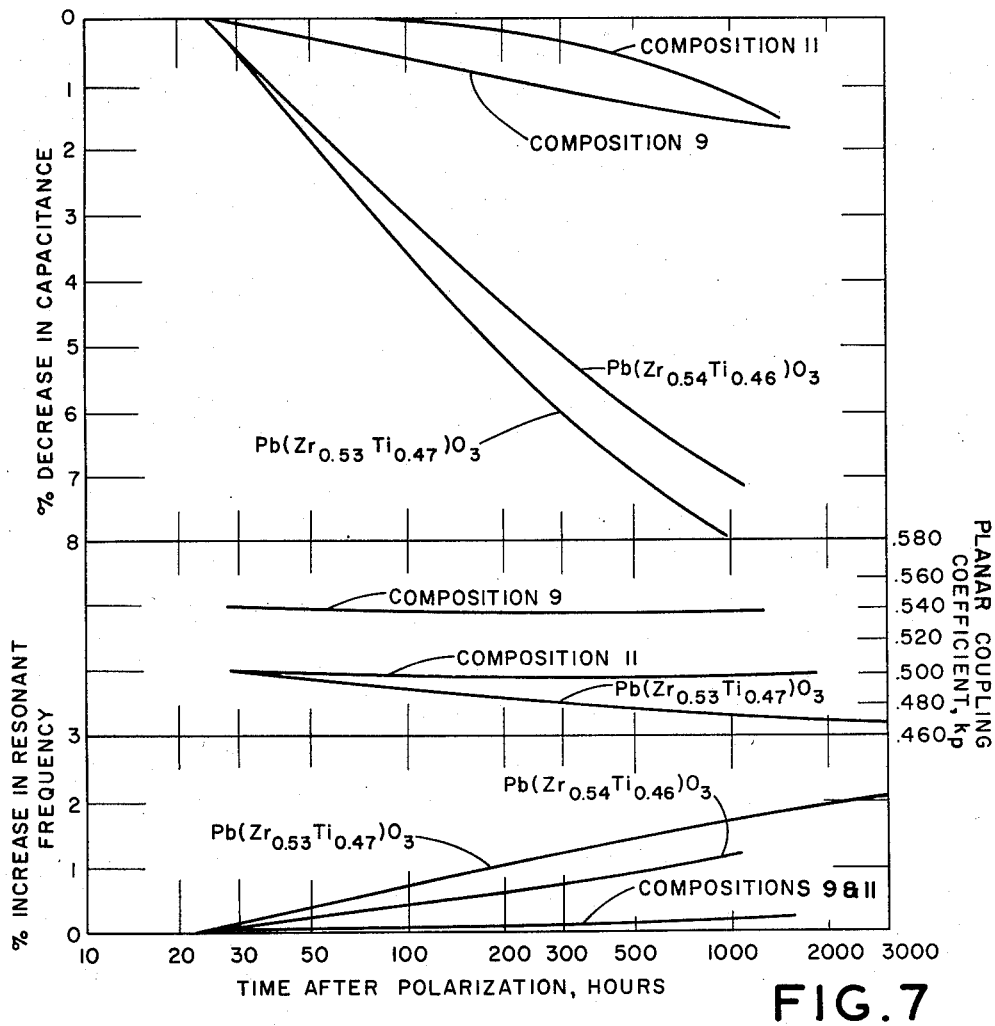

The effects of aging on various exemplary compositions, viz., 2, 4, 9 and 11, are graphically set forth and compared with conventional lead zirconate titanate compositions in Figures 4, 5, 6 and 7. In Figure 7, a common abscissa is used representing elapsed time after polarization, on a logarithmic scale; three ordinate scales, placed alternately left and right, are used to represent percentage increase in resonant frequency, the planar coupling coefficient, and percentage decrease in capacitance. In all cases the starting point of the curves is 24 hours after polarization.

Referring to the curves of resonant frequency (Figure 4 and the lowermost set of curves in Figure 7), it will be seen there is little aging in the resonant frequency of compositions 2 and 4 and 9 and 11 (shown in composite curves because the individual curves are so similar in value and configuration as not to allow clear separate representation on the scale of the drawing). After more than 1000 hours of aging, the resonant frequency of these compositions increases only about 0.2% whereas the conventional lead zirconate titanate ceramics showed 1.1 and 1.8% increases in the same period.

Figure 5:
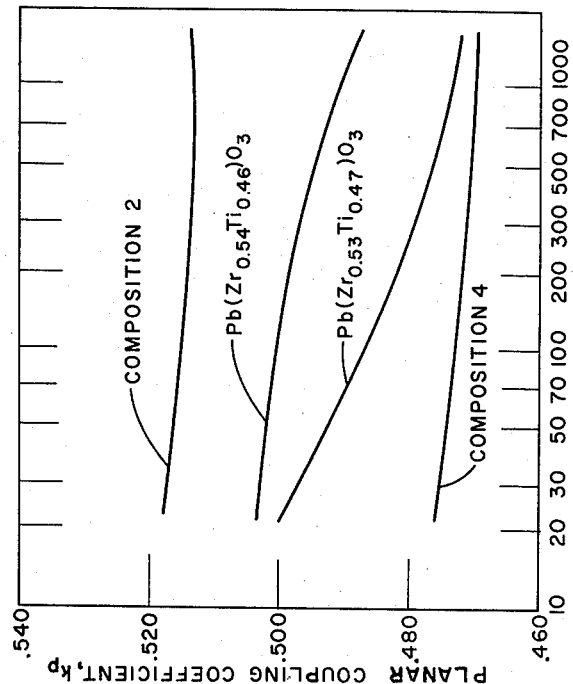

Referring to the curves in Figure 5 and the middle set of curves in Figure 7, it will be observed that the aging in the planar coupling coefficients of example compositions 2, 4, 9 and 11 is almost negligible while both of the plain lead zirconate titanate ceramics exhibit significant decreases in coupling with the elapse of time after polarization. With regard to composition 4, the coupling coefficient is somewhat lower than that of the unmodified lead zirconate titanate compositions at 24 hours after polarization but the difference in coupling progressively diminishes with aging and a protection of the curves indicates that the difference will become nil after further aging. Furthermore, in many applications, a stable coupling is more desirable, even if lower, than a coupling which decays more rapidly with time.

Turning to the curves in Figure 6 and the uppermost set in Figure 7, compositions 2, 4, 9 and 11 show a decrease in capacitance of less than 2% after 1000 hours aging whereas both of the unmodified lead zirconate titanate ceramics show a capacitance decrease of 7 or 8% in the same period.

The compositions disclosed are further characterized by relative temperature stable frequency constants. For example, the frequency constant of composition 2 varies only ±½% from −40° to 160° C.

Figure 8:
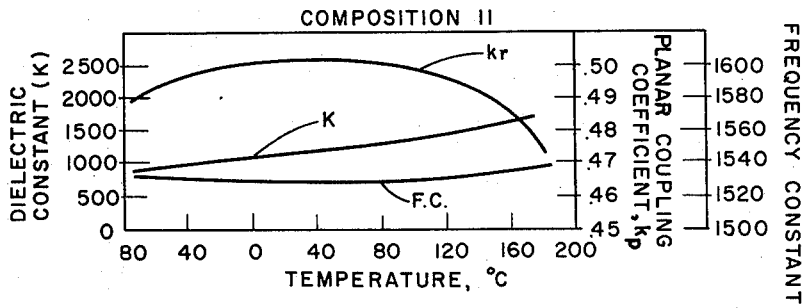

The temperature dependence of frequency constant, dielectric constant and planar coupling coefficient, for composition 11 is shown in Figure 8 wherein it will be noted that these parameters show but little change in value over the temperature range −40 to 120° C. which would cover the vast majority of operating conditions.

In addition to the advantageous properties outlined above, compositions according to the present invention yield ceramics of good physical quality and which polarize well.

While there have been described what at present are considered to be the preferred embodiments of the invention, it will be obvious to those skilled in the art that various changes and modifications can be made therein without departing from the invention, and it is aimed, therefore, in the appended claims to cover all such changes and modifications as fall within the true spirit and scope of the invention.

I claim:

1. A ferroelectric ceramic comprising approximately 95 percent by weight of a material selected from those defined by and included within area ABCD of the diagram in Figure 3, said material including, as a substituent for a molar equivalent of lead therein, from zero to about 20 atom percent, in the aggregate, of at least one alkaline earth element selected from the group consisting of strontium and calcium, and further comprising at least 0.10 weight percent, on an oxide basis, in the aggregate of at least one member of the group consisting of niobium, tantalum, and the rare earth elements including yttrium but excluding cerium.

2. A novel composition of matter consisting essentially of a base material selected from those defined by and included within the area ABCD of the diagram of Figure 3 and containing, as a substituent for an equivalent amount of lead therein, from zero to 20 atom percent in the aggregate of at least one alkaline earth element selected from the group consisting of calcium and strontium, and further containing 0.1 to 5.0 weight percent, on an oxide basis, in the aggregate of at least one member of the group consisting of niobium, tantalum, and the rare earth elements including yttrium but excluding cerium.

3. As a novel composition of matter, a solid solution consisting essentially of: a material selected from those defined by and included within the area ABCD of the diagram of Figure 3; at least one alkaline earth element selected from the group consisting of calcium and strontium, said alkaline earth metal being present as a substituent for from zero to approximately 20 atom percent of the lead in said solid solutions; and from about 0.1 to 5.0 weight percent, on an oxide basis, in the aggregate of at least one member of the group consisting of niobium, tantalum, and the rare earth elements including yttrium but excluding cerium.

4. As a novel composition of matter, a ceramic solid solution consisting essentially of: a material selected from the area EFGH of the diagram of Figure 3; at least one alkaline earth metal selected from the group consisting of calcium and strontium, said alkaline earth element being present as a substituent, in the aggregate, for from zero to about 20 atom weight percent of the lead in said material; and from about 0.1 to 5.0 weight percent, on an oxide basis, in the aggregate of the group consisting of niobium, tantalum, and the rare earth elements including yttrium but excluding cerium.

5. A dielectric ceramic body formed of a solid solution consisting essentially of electromechanically sensitive lead zirconate titanate having a lead zirconate:lead titanate mol ratio of from 90:10 to 40:60 and containing about 0.1 to 5.0 weight percent, in the aggregate of at least one member of the group consisting of the oxides of niobium, tantalum, yttrium and the rare earth elements except cerium.

6. A dielectric ceramic body formed of a solid solution consisting essentially of electromechanically sensitive lead zirconate titanate having a lead zirconate:lead titanate mol ratio of from 90:10 to 40:60 and containing from 0.1 to 5.0 weight percent in the aggregate of the oxides of lanthanum and niobium.

7. A dielectric ceramic body formed of a solid solution consisting essentially of lead zirconate and lead titanate in a mol ratio of about 60:40 to 50:50 and containing from about 1 to 2 weight percent of neodymium oxide.

8. A dielectric ceramic body formed of a solid solution consisting essentially of lead zirconate and lead titanate in a mol ratio of about 60:40 to 50:50 and containing from about 1 to 2 weight percent lanthanum oxide.

9. A dielectric ceramic body formed of a solid solution consisting essentially of lead zirconate and lead titanate in a mol ratio of about 60:40 to 50:50 and containing from about 1 to 2 weight percent of niobium oxide.

10. A dielectric ceramic body formed of a solid solution consisting essentially of lead zirconate and lead titanate in a mol ratio of about 60:40 to 50:50 and containing from about 1 to 2 weight percent tantalum oxide.

11. A ceramic composition consisting essentially of lead zirconate and lead titanate in a mol ratio of about 54:46 and containing from about 1 to 2 weight percent of neodymium oxide.

12. A ceramic composition consisting essentially of lead zirconate and lead titanate in a mol ratio of about 54:46 and containing about 1 to 2 weight percent of lanthanum oxide.

13. A ceramic composition according to claim 12 in which about 5 to 15 atom percent of the lead in the lead zirconate titanate is replaced by strontium.

14. A ceramic composition consisting essentially of $Pb_{0.95}Sr_{0.05}(Zr_{0.54}Ti_{0.46})O_3$ and about 1 to 2 percent by weight in the aggregate of at least one member of the group consisting of niobium, tantalum, and the rare earth elements including yttrium but excluding cerium.

15. A ceramic composition consisting essentially of lead zirconate and lead titanate in a mol ratio of about 54:46 and containing from about 1 to 2 weight percent of tantalum oxide.

16. A ceramic composition consisting essentially of lead zirconate and lead titanate in a mol ratio of about 54:46 and containing about 1 to 2 weight percent of niobium oxide.

17. A ceramic composition according to claim 16 in which about 5 to 15 atom percent of the lead in the lead zirconate titanate is replaced by strontium.

18. An electromechanical transducer comprising an electrostatically polarizable ferroelectric ceramic body consisting essentially of lead zirconate titanate having a lead zirconate:lead titanate mol ratio of from 90:10 to 40:60 and containing from about 0.1 to 5 weight percent in the aggregate of at least one member of the group consisting of niobium, tantalum, and the rare earth elements including yttrium but excluding cerium.

19. An electromechanical transducer comprising an electrostatically polarizable ferroelectric polycrystalline aggregate consisting essentially of a lead zirconate titanate having a lead zirconate:lead titanate mol ratio of from 90:10 to 40:60 and containing from about 0.1 to 5 weight percent in the aggregate of at least one member of the group consisting of niobium, tantalum, and the rare earth elements including yttrium but excluding cerium.

20. A dielectric ceramic body consisting essentially of oxidic lead, titanium, zirconium and at least one alkaline earth selected from the group consisting of strontium and calcium, said lead and alkaline earth being combined in solid solution with said titanium and zirconium in proportions corresponding to lead and alkaline earth zirconates and titanates, the ratio of zirconates to titanates, on a mol basis, being in the range from about 90:10 to about 40:60 and the atom ratio of lead to alkaline earth being in the range from about 100:0 to about 70:30, said ceramic body further containing, also in solid solution, an aggregate quantity of from about 0.1 to 5.0 weight percent, on an oxide basis, of at least one additional constituent selected from the group consisting of niobium, tantalum, yttrium, and the rare earth elements except cerium.

References Cited in the file of this patent

UNITED STATES PATENTS

| 2,708,244 | Jaffe | May 10, 1955 |
| 2,731,419 | Godman | Jan. 17, 1956 |

FOREIGN PATENTS

| 167,987 | Austria | 1951 |
| 1,059,648 | France | 1953 |

UNITED STATES PATENT OFFICE

CERTIFICATE OF CORRECTION

Patent No. 2,911,370                                        November 3, 1959

Frank Kulcsar

It is hereby certified that error appears in the printed specification of the above numbered patent requiring correction and that the said Letters Patent should read as corrected below.

Column 5, line 50, after "additions of" insert -- from --; column 7, line 66, for "increase is" read -- increase in --; column 11, line 36, for "protection" read -- projection --; column 12, line 39, after "aggregate" insert -- of at least one member --.

Signed and sealed this 26th day of April 1960.

(SEAL)
Attest:

KARL H. AXLINE                                       ROBERT C. WATSON
Attesting Officer                                Commissioner of Patents